US008897790B2

(12) United States Patent
Hamalainen et al.

(10) Patent No.: US 8,897,790 B2
(45) Date of Patent: Nov. 25, 2014

(54) METHOD AND APPARATUS FOR HANDOVER PROCEDURE IN COMMUNICATION NETWORK WITH RELAY EXTENSION

(75) Inventors: Jyri Kalervo Hamalainen, Oulu (FI); Bernhard Raaf, Neuried (DE); Oumer Teyeb, Aalborg (DK); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 215 days.

(21) Appl. No.: 12/919,245

(22) PCT Filed: Feb. 27, 2009

(86) PCT No.: PCT/EP2009/052370
§ 371 (c)(1),
(2), (4) Date: Dec. 17, 2010

(87) PCT Pub. No.: WO2009/106615
PCT Pub. Date: Sep. 3, 2009

(65) Prior Publication Data
US 2011/0086639 A1    Apr. 14, 2011

(30) Foreign Application Priority Data

Feb. 29, 2008 (FI) .................................. 20085194

(51) Int. Cl.
*H04W 36/00* (2009.01)
*H04B 7/26* (2006.01)
*H04W 36/34* (2009.01)
*H04W 84/04* (2009.01)
*H04W 16/26* (2009.01)

(52) U.S. Cl.
CPC ............ *H04W 36/34* (2013.01); *H04W 84/047* (2013.01); *H04B 7/2606* (2013.01); *H04W 16/26* (2013.01)

USPC ...... 455/438; 455/41.2; 455/41.3; 455/435.1; 455/435.2; 455/436; 455/437; 455/439; 455/440; 455/441; 455/442; 455/443; 455/444; 455/552.1; 455/553.1; 370/310.2; 370/328; 370/331; 370/332; 370/333; 370/334

(58) Field of Classification Search
USPC ......... 455/432.1, 435.1, 436–445, 41.2, 41.3, 455/552.1, 553.1; 370/310.2, 328, 331–334
See application file for complete search history.

(56) References Cited

U.S. PATENT DOCUMENTS 4,759,051 A    7/1988   Han ................................. 379/59
6,052,558 A *  4/2000   Cook et al. .................... 455/12.1
(Continued)

FOREIGN PATENT DOCUMENTS

EP    1775983 A1    4/2007
EP    1775984 A2    4/2007
(Continued)

OTHER PUBLICATIONS

Kanchei, et al., "MS Handover with Non-transparent RS", IEEE 802.16, Broadband Wireless Access Working Group, vol. C802.16J-07/072, Mar. 6, 2007, 10 pgs.

(Continued)

*Primary Examiner* — Steve D Agosta
(74) *Attorney, Agent, or Firm* — Harrington & Smith (57) ABSTRACT

An enhanced solution for controlling a handover procedure for handing a terminal device over from a source cell to a target cell in a communication network with relay nodes is provided. In the solution, the relay nodes actively assist in the handover procedure by, for instance, initiating the handover procedure, configuring a relayed link and buffering user data at the relay node.

33 Claims, 5 Drawing Sheets

(56) References Cited

U.S. PATENT DOCUMENTS

| | | | |
|---|---|---|---|
| 6,141,533 A * | 10/2000 | Wilson et al. | 455/11.1 |
| 7,006,461 B2 * | 2/2006 | Kilfoyle et al. | 370/315 |
| 7,224,977 B2 * | 5/2007 | Cavalli et al. | 455/452.1 |
| 7,406,295 B1 * | 7/2008 | Yarkosky | 455/9 |
| 2006/0062191 A1 | 3/2006 | Matsumoto | 370/338 |

FOREIGN PATENT DOCUMENTS

| | | |
|---|---|---|
| WO | WO 2005/067173 A1 | 7/2005 |
| WO | WO 2006/018670 A1 | 2/2006 |
| WO | WO 2007/078138 A2 | 7/2007 |
| WO | WO 2007/119168 A2 | 10/2007 |

OTHER PUBLICATIONS

Sunghyun et al.: "Relay Assisted Soft Handover in Multihop Cellular Networks", Proceedings of the 2nd international conference on Ubiquitous Information Management and Communication, Jan. 31-Feb. 1, 2008, pp. 136-139, [retrieved on Nov. 25, 2008], Retrieved from the Internet: URL:http://portal.acm.org/citation.cfm?id=1352821>.

* cited by examiner

METHOD AND APPARATUS FOR HANDOVER PROCEDURE IN COMMUNICATION NETWORK WITH RELAY EXTENSION

FIELD

The invention relates to a method, a central node, a relay node and a computer program for controlling an enhanced handover procedure in a communication network with relay nodes.

BACKGROUND

A handover can be defined as a change of access point in the communication network. In other words, in the handover, a terminal device such as a mobile terminal switches from a cell of a current serving network element such as a central node or a base station to another cell served by another network element. Alternatively, the handover may comprise a change of system, i.e., from the universal mobile terrestrial system (UMTS) to the global system for mobile communications (GSM). The handover typically occurs when the received signal level or another quality metric from another central node is higher than that from the current serving central node. Hence, in order to ensure the required quality of service (QoS), the terminal device may change the serving central node to the one with the highest received power level.

Relay stations or relay nodes have been introduced as a way to extend the coverage area of a central node. Furthermore, they can be applied to reduce the average radio transmission power at the terminal device and to increase the capacity/throughput at the cell-edge. The capacity may also be increased at the shadowed areas in the cell as well as in the locations where the traffic demand is high such as in airports or other hot spots. They may be applied in an Evolved UMTS Terrestrial Radio Access Network (E-UTRAN). The E-UTRAN is also known as 3.9G or a Long Term Evolution (LTE) in $3^{rd}$ generation partnership project (3GPP).

The introduction of the relay nodes to the communication network changes the architecture of the network and increases the probability of the handovers. A system without relay nodes comprises only one type of handover, i.e., from one central node to another. In the communication network with relay nodes, the handover may additionally occur between a central node and a relay node within the same cell, between a central node and a relay node in an adjacent cell, between two relay nodes within the same cell and between two relay nodes in different cells.

Currently there are handover procedures for communication systems with a relay extension. However, in the current handover procedures with the relay extension, the handover is controlled completely at the central nodes. This kind of handover control conducted solely at the central nodes is not flexible and needs improvement.

BRIEF DESCRIPTION OF THE INVENTION

According to an aspect of the invention, there are provided methods as specified in claims 1, 6 and 10.

According to another aspect of the present invention, there are provided apparatuses as specified in claims 13, 18 and 23.

According to another aspect of the present invention, there is provided a system as specified in claim 30.

According to yet another aspect of the present invention, there is provided computer program products as specified in claims 31, 32 and 33.

Further advantages and embodiments of the invention are described in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations, this does not necessarily mean that each reference is made to the same embodiment(s), or that a particular feature only applies to a single embodiment. Single features of different embodiments may also be combined to provide other embodiments.

Figure 1:
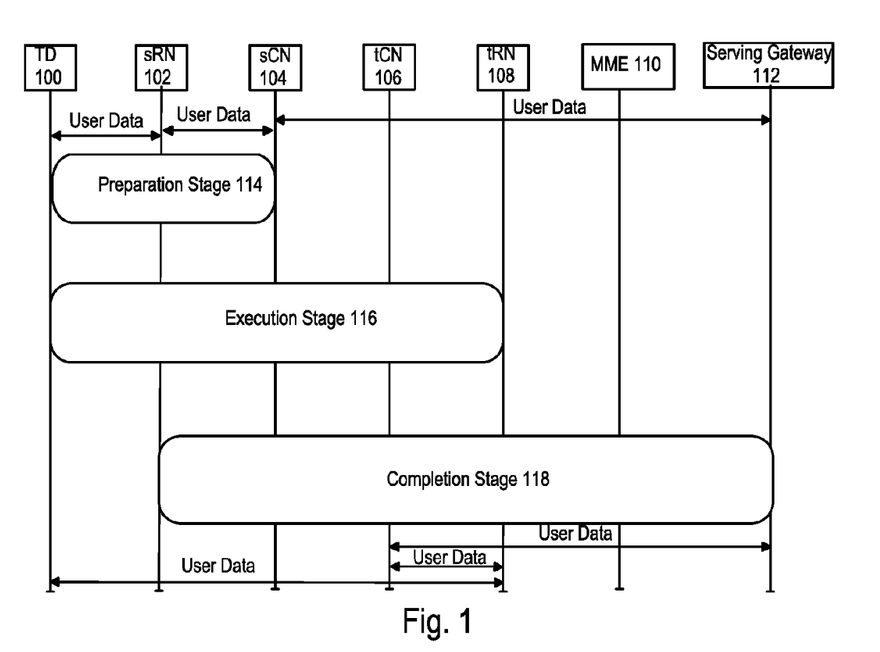
FIG. 1 shows a handover procedure for a terminal device in a communication network with a relay extension.

Although this invention is described using LTE (E-UTRAN) as a basis, it could be applicable to any other wireless mobile communication systems as well. The telecommunication system may have a fixed infrastructure providing wireless services to subscriber terminals. FIG. 1 illustrates the processes that may occur in a handover procedure in the communication network with the relay extension. The handover procedure may assign a terminal device, or similar user equipment such as a mobile terminal, from a source cell to a target cell. The source cell may apply other radio access networks than the target cell. For example, the source cell may operate under UMTS and the target cell may apply E-UTRAN or GSM, etc. The cell may comprise a central node such as a base station, an evolved node B as in E-UTRAN, a radio network controller (RNC) or any other network element capable of controlling a radio communication within the cell. Furthermore, the cell may comprise a relay node or relay nodes. From now on the relay node and the central node located at the source cell of the handover are called the source relay node and the source central node, respectively. Similarly, the relay node and the central node at the target cell of the handover are called the target rely node and the target central node, respectively.

Although the description of an embodiment regarding the FIGS. 1 to 4 is given for a communication network where the handover occurs between two relay nodes that belong to different cells (the source cell and the target cell) served by different central nodes, a person skilled in the art will readily acknowledge and understand, that the exemplary embodiment can be applied with minor and obvious changes to a communication network where the handover occurs between a central node and relay nodes within the same cell, between a central node and a relay node in an adjacent cell or between two relay nodes within the same cell. Thus, the scope of the invention is not limited to a case where there are relay nodes at both the source cell and the target cell of the handover. It may happen that a handover for a terminal device occurs, e.g., from a source cell without a relay node to a target cell with a relay node.

Figure 2:
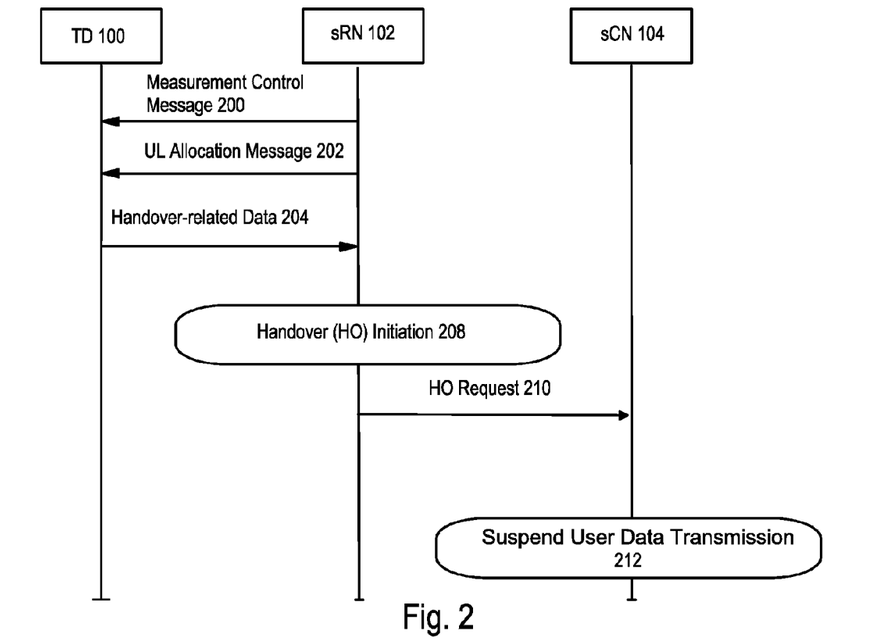
FIG. 2 shows a preparation stage of the handover for the terminal device in the communication network with the relay extension.
Figure 3:
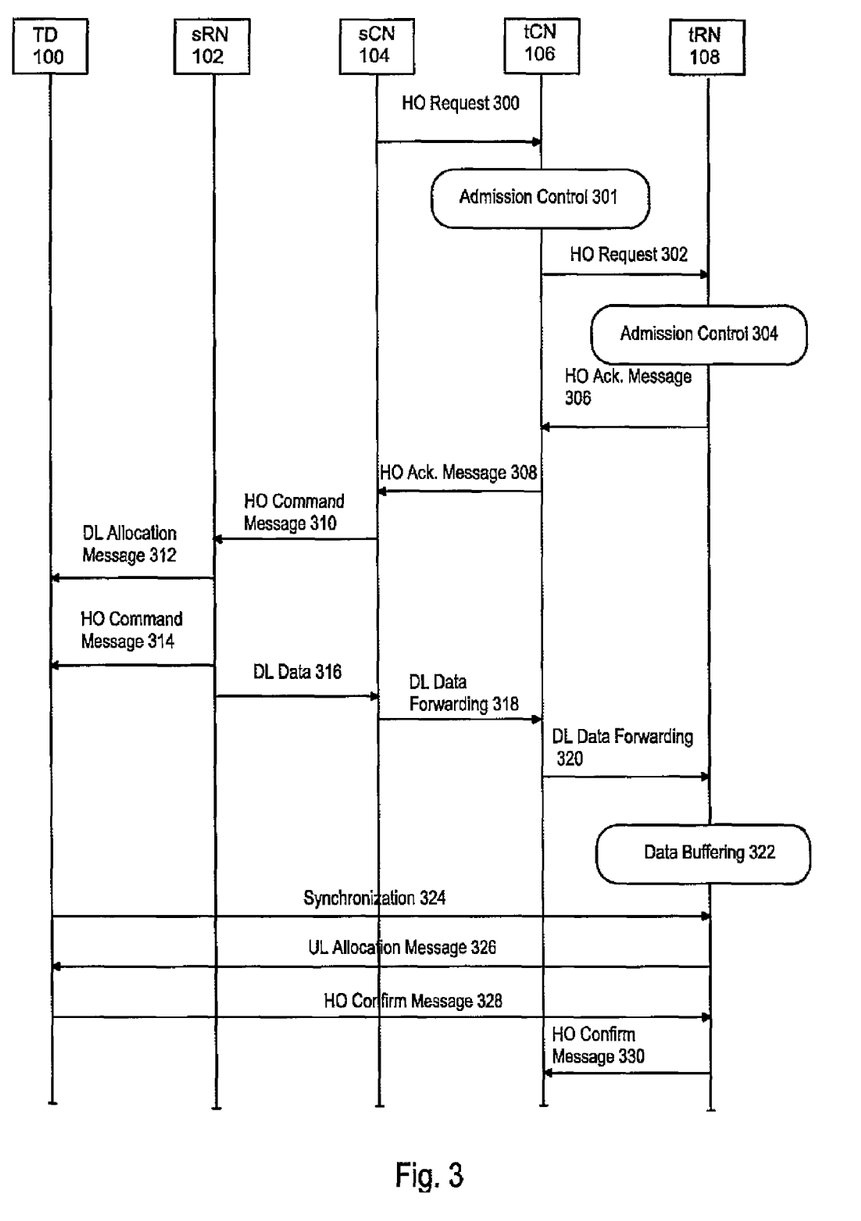
FIG. 3 shows an execution stage of the handover for the terminal device in the communication network with the relay extension.
Figure 4:
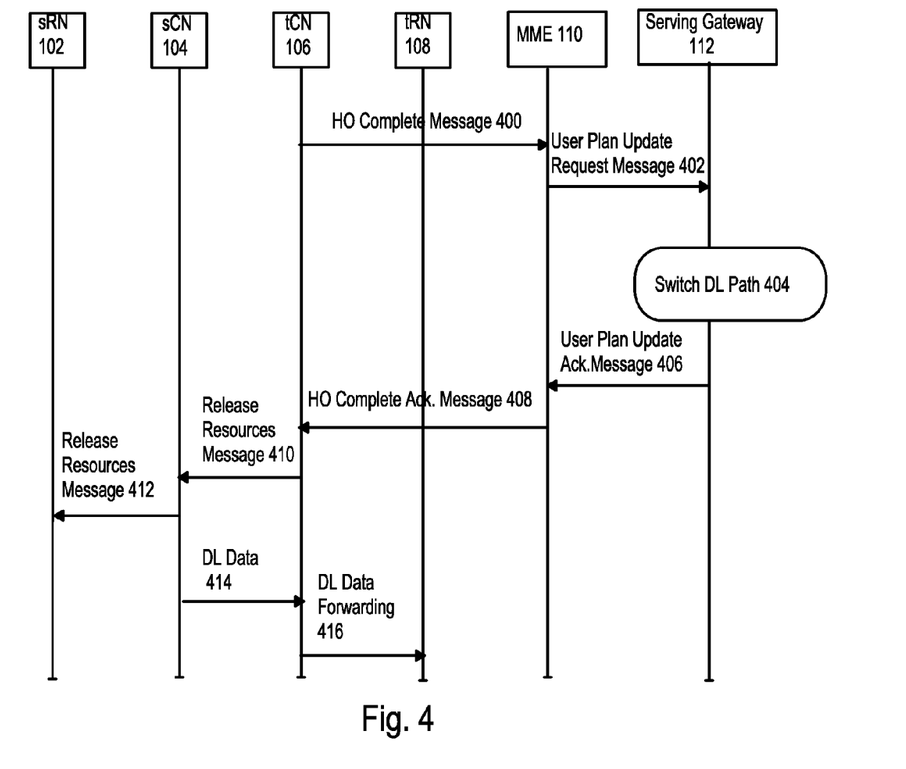
FIG. 4 shows a completion stage of the handover for the terminal device in the communication network with the relay extension.

The handover procedure may be subdivided into three stages. These stages can be seen in FIG. 1 and are called a preparation stage 114, an execution stage 116 and a completion stage 118 of the handover (HO). The categorization illustrated in FIG. 1 is only one possibility to perform the categorization. Similarly the tasks performed in each of the three categories may vary from that being shown in FIGS. 2 to 4. For example, some of the tasks in FIG. 3 could have been included in FIG. 2 instead of FIG. 3. Thus, FIGS. 2 to 4 illustrate only one exemplary categorization.

In a communication system with a relay extension, the network elements that may be part of the handover procedure include a terminal device (TD) 100, a source relay node (sRN) 102, a source central node (sCN) 104, a target central node (tCN) 106, a target relay node (tRN) 108, a mobility management entity (MME) 110 and a service gateway 112. The terminal device 100 may be any user equipment such as a mobile station and the central node may be, e.g., an evolved node B as in E-UTRAN. Central nodes 104, 106 can communicate with other nodes, both central and relay nodes, via an air interface or via a wired interface. The communication connection between the central nodes is called an X2 interface in the specifications for E-UTRAN.

In an embodiment, at least one of the relay nodes at the source and the target cells, is connected to the corresponding central node via a wireless or wired X2 interface. In this case the "smart" relay node may collaborate with the central node in the handover procedure as explained below.

In an embodiment, at least one of the relay nodes is a "dumb" radio bearer relay node incapable of performing controlling procedures related to a handover for the terminal device.

In the categorization illustrated in FIG. 1, the preparation stage 114 includes operations related to the initiation of the handover for the TD 100. The network elements included in this stage are the TD 100, the sRN 102 and the sCN 104. Functionalities relating to the realization of the handover for the TD 100 are handled in the execution stage. The network elements that take part in this stage may include the tCN 106 and the tRN 108 in addition to the elements in the preparation stage 114. In the completion stage 118, the network elements included in this stage are the sRN 102, the sCN 104, the tCN 106, the tRN 108, the MME 110 and the serving gateway 112. The completion stage 118 handles operations related to, e.g., releasing of the resources and finalizing the handover procedure for the TD 100.

In cellular communication networks, the terminal devices may be mobile, and moving terminals may introduce additional requirements for the system. Connections may be set up on demand and after they are not needed, the resources may be released. As the terminal devices may be transferred to another cell due to its movement, the serving nodes may exchange information regarding the movements of the terminal device. The mobility management entity 110 handles such exchanges of information between the central nodes together with a radio resource control (RRC) layer. The MME may take care of, e.g., the preparation of resources at the target central node 106, allocation of the terminal device 100 to new radio resources, non-access signalling, tracking area list management, roaming, authentication and releasing resources from the source central node 104. In other words, the MME 110 serves as an anchoring point for mobile terminal connections. Furthermore, the central nodes 104, 106 may be logically connected to the MME 110. The interface between the central nodes 104, 106 and the MME 110 is known as an S1 interface in the specifications for E-UTRAN. The MME 110 is, in LTE, part of the evolved packet core (EPC).

The serving gateway 112 may be comprised in a service architecture such as the evolved packet system (EPS) in the LTE. The EPS is, in the LTE, part of the EPC. The serving gateway 112 comprises functions, e.g., to switch the user plane for support of the mobility of the terminal device 100, terminate the user plane packets for paging reasons and route and forward packets. The serving gateway 112 may be connected to an external MME 110 or both of them may be physically collocated.

The signalling during the handover procedure may occur on the RRC layer. However, there is information that may be exchanged on the physical radio interface (PHY) layer or on the medium access control (MAC) layer. Examples of this information exchange include the transmission of an UL/DL allocation and synchronization signalling as well as the user data.

Three core functions of a handover, namely initiation, admission control and data buffering/forwarding, may be controlled in the handover solutions by the source and the target central nodes 104 and 106, respectively. This could be the case even if there were simple "dumb" relay nodes in the network. However, with more intelligent "smart" relay nodes 102, 108, that are capable of performing the resource management of the terminal device 100, the relay nodes 102, 108 can be configured to play an important role in the handover procedure. Relay nodes 102, 108 can, e.g., collaborate with the central nodes 104, 106 in all of the three core functions of the handover procedure as seen below in the description of an embodiment.

Even though the description is aimed at the relay nodes that are smart enough to assist in a handover, a person skilled in the art will readily acknowledge that the procedure can be easily translated to the case where there are "dumb" relay nodes in either cell, i.e., relay nodes that are incapable of collaborating with the central nodes in controlling the handover to hand the terminal device over from a source cell to a target cell.

Figure 5:
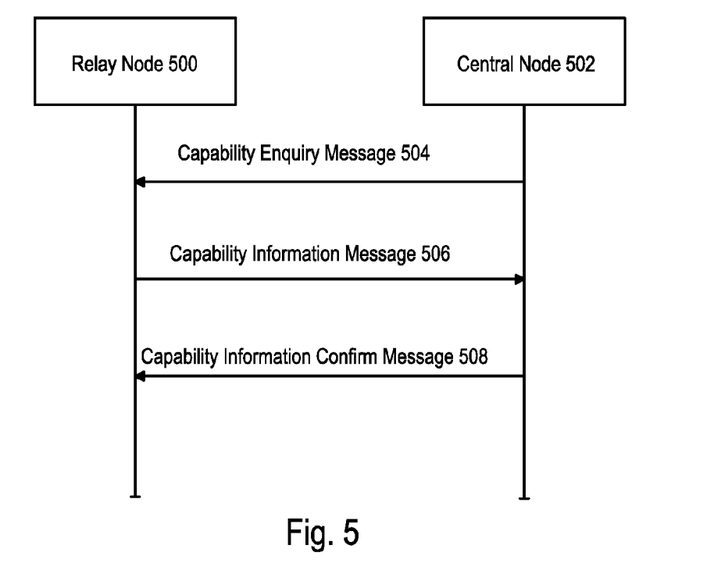
FIG. 5 illustrates the procedure of capability enquiry between a relay node and a central node.

The central node and the relay node may communicate with each other so that the central node may determine whether the relay node is capable of assisting in the handover in the way described above. FIG. 5 illustrates the communication between the relay node 500 and the central node 502. As said, the capabilities of a relay node 500 may be enquired, by the central node 502, in order to determine whether the relay node 500 is able to collaborate with the central node 502 in the handover procedure of a terminal device. The relay node 500 may communicate its capability in a similar fashion as terminal devices communicate their capability to the central node 502.

The central node 502 may transmit a capability enquiry message 504 to the relay node 500. The capability enquiry message may contain an enquiry whether the relay node is able to allow one more terminal device in terms of available radio resources at the relay node, or it may be more general enquiry regarding the capabilities of the relay node in collaborating with the central node in the handover of the terminal device. The capability enquiry message 504 may include a triggering function, which when received by the relay node 500 may cause the relay node 500 to send a capability information message 506. The capability information message 506 may contain data to reveal the capabilities of the relay node 500 regarding the handover. The data may be, e.g., the availability of radio resources at the relay node 500. Upon receiving the capability information message 506, the central node 502 may confirm the reception of the relay node capability information 506 by transmitting an information confirm message 508 to the relay node 500, in which the central node may confirm that the knowledge about, e.g., the capability information of the relay node 500 in collaborating with the central node 502 during the handover procedure has been received.

When the relay node is set up or activated, it may inform the central node whether it is a "smart" node or a "dumb" node in the way described above. That is, it may inform how it is able to collaborate with the central node during the handover.

In the beginning of the preparation stage 114, user data transmission may occur between the terminal device 100 and the source relay node 102, between the source relay node 102 and the source central node 104 and between the source central node 104 and the serving gateway 110 as shown in FIG. 1.

FIG. 2 shows, a detailed procedure of the preparation stage 114. In an embodiment, the preparation stage 114 begins by sending a measurement control message 200 from the sRN 102 to the TD 100. The measurement control message 200 may serve as a trigger for performing certain measurements at the TD 100. In addition, it may contain instructions as to what parameters are to be measured. The sRN 102 may further transmit an UL allocation message 202 to the TD 100 to allocate the uplink for the communication from the TD 100 to the sRN 102. The UL allocation message may be transmitted on the PHY layer. Alternatively, the TD 100 may perform measurements without a specific enquiry from the sRN 102, in which case the measurement control message 202 and UL allocation message 204 may be omitted, and the TD 100 uses a predefined channel for UL communication with the sRN 102.

The TD 100 may be triggered to transmit handover-related data 204 obtained through the measurements to the sRN 102. The handover-related data may contain information regarding the current serving cell and the adjacent cells to the current serving cell. It may further comprise the status of certain parameters. The parameters that are measured may include, but are not limited to, at least one of the following: received signal strength and carrier-to-interference ratio (CIR) at the serving cell as well as at the adjacent neighbouring cells.

In the case where the sCN 104 performs the handover decision independently from the sRN 102, the sRN 102 may further transmit the hand-over-related data to the sCN 104. However, if the sRN 102 is capable of collaborating in the handover procedure via the X2 interface, there is no need for the sRN 102 to further transmit the handover related data to the sCN 104. In that case, the sRN 102 may conduct the handover initiation 208 by processing the handover-related data 204, by determining the need of the handover for the TD 100 and by transmitting an HO request 210 to the sCN 104 based on the information that the sRN 102 obtains in the handover-related data 204. The HO request 210 may comprise a request to perform the handover for the TD 100 as well as information about the source and the target cells of the handover. The transmission of the HO request 210 may be controlled on the RRC layer and, hence, the sRN 102 may comprise such a layer in addition to the MAC layer and the PHY layer.

The sRN 102 may finally perform the decision to perform the handover based on at least one of the following: the handover-related data 204, radio resource management information such as dynamic resource allocation, radio admission and radio bearer data. The decision may result in a command to perform the handover for the TD 100, or it may result in a decision that the handover for the TD 100 may be suspended due to, e.g., prevailing lack of resources.

In an embodiment, the HO initiation 208, the processing of the handover-related data 204 and the decision are performed at the sRN 102 instead of sCN 104. Thus, the relay nodes collaborate with the central nodes and this results in saving the resources of the sCN 104.

FIG. 3 illustrates a detailed structure of the execution stage 116 in a handover with the relay extension. In an embodiment, the handover execution stage 116 begins when an HO request message 300 is sent to the tCN 106. The HO request message 300 may be the same as the HO request message 210, or it may be that the sCN 104 processes the HO request message 210 and transmits another HO request message 300 to the tCN 106. The sCN 104 may further decide to suspend the user data transmission 212 to the sRN 102 after receiving the HO request 210 and after transmitting the HO request 300 to the tCN 106. The HO request 300 includes necessary information related to the HO. The necessary information may include, e.g., radio resource control information such as allocation information of the TD 100, the source cell identification information and the evolved packet system bearer quality of service information.

At this point, the HO request message 300 may further include an approval from the sCN 104 for the handover of the TD 100. The tCN 106 may further process the HO request 300 and transmit an HO request 302 to the tRN 108. The HO request message 302 may be the same as the HO request message 300, or it may be that the tCN 106 processes the HO request message 300 and transmits another HO request message 302 to the tRN 108, wherein an enquiry regarding the possibility of handing the TD 100 over to the tRN 108 may be performed. If the relay node is "dumb" node, the step 302 may be omitted in which case the target central node may perform the decision whether to hand the terminal over to the target cell.

The tCN 106 carries out the admission control 301 for a so-called backhaul link. This may occur after the tCN 106 has received the HO request message 300. The backhaul link denotes a link for traffic transportation between distributed sites (typically access points) such as a link between the tCN 106 (relay node controller) and the tRN 108. In other words, the tCN 106, conducts an allocation and/or configuration for a communication link. It may be applied to, e.g., transmitting the user data. The link may be granted on the basis of the prevailing radio resource availability and the information contained in the handover request 300. The admission control 301 for the backhaul link relates to an establishment of a communication link for the TD 100.

The tRN 108, on the other hand, may conduct the admission control 304 for the relayed communication link between the TD 100 and tRN 108 after it has been determined that the TD 100 is to be handed over. The admission control may be based on the available resources at the tRN 108 that can be granted to the TD 100. That is, the tRN 108 allocates the required resources for the relayed link connection, wherein the allocation of the link relates to an establishment of a communication link for the TD 100. As the admission control 304 is partly handed over to the tRN 108 connected to the tCN 106 via the X2 interface, the tCN 106 can apply its resources to other tasks. The tCN 106 may still be responsible for the admission control of the backhaul link between the tCN 106 and the central node controller.

Once the admission control 304 is performed and available resources are allocated to the TD 100, an HO acknowledge message 306 may be sent to the tCN 106. The HO acknowledge message 306 may contain, e.g., the security identifiers of the tRN 108, the possible modifications such as changes in the allocation of other terminal devices and a confirmation that it is allowed to proceed further with the handover for the TD 100.

The tCN 106 may transmit the HO acknowledge message 308 to the sCN 104. The HO acknowledge message 308 may be the same as HO acknowledge message 306 or it may differ from the HO acknowledge message 306, if the tCN 106 has determined that there is information that needs to be included in the HO acknowledge message 308. The sCN 104 may be configured to transmit an HO command message 310 to the sRN 102 based on the information received from the HO acknowledge message 306, 308. The HO command message 310 may contain the same data as the HO request acknowledge message 306 and it may further include instructions for the sRN 102 or the TD 100 related to the handover for the TD 100.

The sRN may transmit a DL allocation message 312 to the TD 100 possibly on the PHY layer. The DL allocation message 312 contains information about the downlink channel from which the TD 100 can expect to receive information. The DL allocation message 312 is followed by a transmission of the HO command message 314 from the sRN 102 to the TD 100. After receiving the HO command message 310, 314, the TD 100 may begin to detach from its current serving cell and start a synchronization 324 with the target cell of the handover.

At the same time, the sRN 102 connected to the sCN 104 via the X2 interface may begin the transmission of the DL data 316 to the sCN 104. The DL data 316 may contain buffered and in-transit user data targeted to the TD 100. However, in a case where the sRN 102 is a radio bearer relay node incapable of controlling the handover procedure, the data that is buffered in the sRN 102 may be flushed and, thus, not transmitted to the sCN 104. Even in this case there may not be any actual data loss, since the buffered packets to be flushed in the sRN 102 can be reconstructed at the sCN 104 since a data reception acknowledgement from the TD 100 has not been received, and from this the sCN 104 knows that the TD 100 did not receive the data. Consequently, the data can be reconstructed and transmitted to the target node instead of the sRN 102.

The sCN 104 may perform a DL data forwarding 318 to the tCN 106 which may further perform DL data forwarding 320 to the tRN 108. Hence, the data targeted to the TD 100 of the handover is transferred from the source cell to the target cell during the handover for the TD 100. As data buffering 322 may be performed at the memory unit, such as a data buffer of the tRN 108, resources are saved at the tCN 106. The tRN 108 may store the buffered data until the handover for the TD 100 is completed. Additionally, the memory unit of the tRN 108 may store transmission parameters and information related to a wireless communication with mobile terminals.

The TD 100 may carry out the synchronization 324 between the TD 100 and the target node after receiving the handover command message 310, 314, which may contain an execution command for conducting the handover for the TD 100 and information of the target cell. The synchronization 324 may be performed by transmitting a synchronization message from the TD 100 to the tRN 108 on the PHY or on the MAC layer.

Finally, after the synchronization 324 of the TD 100 and the tRN 108 is performed, an UL allocation message 326 may be transmitted on the PHY or MAC layer from the tRN 108 to the TD 100. The UL allocation message 326 contains information about the uplink channel from which the tRN 108 may expect to receive data from the TD 100. The tRN 108 may further transmit timing information to the TD 100, in which the TD 100 obtains the latency information regarding the transmission between the TD 100 and the tRN 108. In other words, the TD 100 may use the timing information to advance or delay its timings of transmissions to the tRN 108 or to the tCN 106 and, thus, compensate for the propagation delay.

The TD 100 uses the UL allocation message 326 to transmit an HO confirm message 328 to the tRN 108. The HO confirm message 328 may contain information regarding the success of the handover procedure with respect to the TD 100. This may be followed by an HO confirm message 330 transmission from the tRN 108 to the tCN 106 controlling the tRN 108.

FIG. 4 illustrates a detailed structure of the completion stage 118 in a handover with the relay extension. In an embodiment, the completion stage begins when the tCN 106 transmits an HO complete message 400 to the MME 110. The HO completion message 400 may include data to inform the MME 110 that the handover for the TD 100 has been executed and successful.

The HO completion message 400 may further comprise, e.g., a triggering function to set up the resources for the new connection links. The acknowledgement of the links, the reorganization of the resources, packet routing and forwarding, and signalling to the other nodes in the communication network to inform of the change of the resources and the handover may be conducted at the MME 110 and at the serving gateway 112. MME 110 may send a user plan update request message 402 to the serving gateway 112. The user plan update message 402 may include instructions to switch the DL path 404 in the serving gateway 112 to ensure that all arriving packets for the TD 100 will from now on be routed to the correct central node. The serving gateway 112 may be triggered to transmit a user plan update acknowledgment message 406 to the MME 110, which may transmit an HO complete acknowledgement message 408 to the tCN 106 informing the tCN 106 that the resource allocations regarding the handover procedure were successful.

After the connection link has been established, the old connection between the source central node 104 and the source relay node 102 may be released. This can be performed by sending a release resources message 410 to the sCN 104 which transmits a release resources message 412 to the sRN 102. From this message the sRN 102 knows that it can release the resources allocated to the TD 100. In addition, any remaining DL data 414 in the sCN 104 that is targeted to the TD 100 of the handover may be transmitted to the tCN 106. The tCN 106 performs DL data forwarding 416 to the tRN 416.

As a result of the handover for the terminal device 100, at the end of the handover, a data transmission may occur between the terminal device 100 and the target relay node 102, between the target relay node 102 and the target central node 104 and between the target central node 104 and the serving gateway 110, as shown in FIG. 1.

Figure 6:
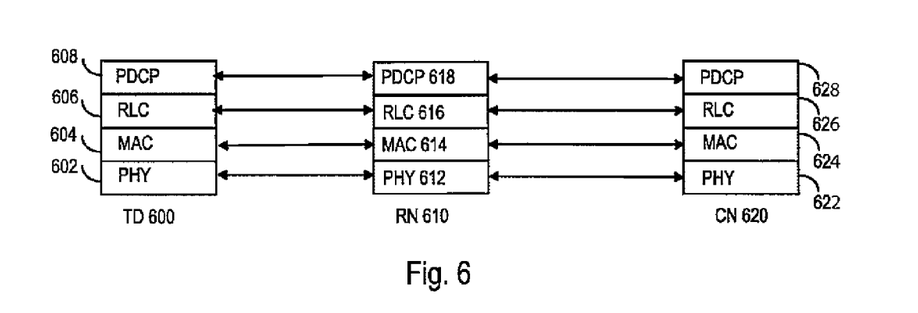
FIG. 6 illustrates the structure of protocol layers at the terminal device, the relay node and the central node.

In the case where there are "dumb" relay nodes in either cell, i.e., relay nodes that are incapable of collaborating with the central nodes in controlling the handover to hand the terminal device over from a source cell to a target cell, the "dumb" relay nodes simply relay the handover related data 204 to the central node which makes all the decisions needed to perform the handover for the terminal device. Similarly, other functions requiring the controlling capabilities of the relay node at the source or the target cell, may be instead conducted at the central node of the source or the target cell, respectively. FIG. 6 shows the protocol layer structures of a terminal device, a central node and a relay node that is connected to the sCN 104 via the X2 interface, i.e., it is a "smart" relay node. The figure shows only the required protocol layers for understanding the handover procedure. Other components, elements or layers have been omitted for reasons of simplicity. The connections shown in FIG. 6 are logical connections, and the actual physical connections may be different. It is apparent to a person skilled in the art that the mobile telecommunication systems also comprise other functions and structures.

In FIG. 6, the protocol layer structures for a user plane (U-plane) of the terminal device (TD) 600, the relay node (RN) 610 and the central node (CN) 620 are illustrated. The TD 600 may include the PHY layer 602, the MAC layer 604, a radio link control (RLC) layer 606 and a packet data convergence protocol (PDCP) layer 608. The CN 620 may comprise the same protocol layer structure as the TD 600.

Depending on what plane is being examined, the RRC layer may replace the PDCP layer 608, 628. The radio resource control layer can replace the PDPC layer 608, 628 when we focus on a control plane (C-plane). The data transferred at the C-plane may be control data to control the resources. The U-plane may handle the user data that is targeted to the TD 600.

The PHY layer 602, 612, 622 that comprises a transceiver may be used to access the radio channel by sending data via a radio communication data channel or by receiving data from the radio communication data channel. The PHY layer 602, 612, 622 may further be used to perform channel coding, hybrid automatic repeat request (HARQ) processing, data modulation and mapping. To a certain degree, the PHY layer 602, 612, 622 may be configured to process information signals received and signals to be transmitted. The PHY layer 602, 612, 622 may be configured to filter and amplify the received information signals and to convert the analog information signals into a digital form. The PHY layer 602, 612, 622 may be configured to convert signals to be transmitted to analog waveforms and transmit the analog waveforms through the radio channel.

The MAC layer 604, 614, 624 may be used to perform the multiplexing of several logical channels on the same transport channel, error correction through HARQ, priority handling and transport format selection.

The RLC layer 606, 626 may include, e.g., transferring the upper layer packet data units, error correction through ARQ, segmentation and resegmentation of packet data units (PDU) and service data units (SDU). The RLC layer 606, 626 may further be applied, e.g., to protocol error detection and recovery and concatenation of SDUs.

The PDCP layer 608, 628 may be used, e.g., to header compression and decompression, retransmission of the SDUs at handover, ciphering, and timer based SDU discard function at UL. It may further be applied to, e.g., transferring the user data and control data by forwarding the received SDUs to the RLC layer 606, 626.

In the case where the sRN 102 is a radio bearer relay node incapable of controlling the handover procedure, the RN 610 may comprise the PHY layer 612 and the MAC layer 614. The relay nodes capable of collaborating with the central node in a handover procedure for the terminal device via the X2 interface may further comprise, e.g., the RLC layer 616 and the PDCP layer 618. Thus, the relay nodes may be configured to control data transmission on these layers in addition to the PHY layer 612 and the MAC layer 614. This may enable them to collaborate with the central node during the handover procedure by, e.g., allocating radio resources related to the relay node.

The PHY layers 602, 612 and 622 may be connected with each other and they may be capable of changing data. The same applies to the MAC layers 604, 614 and 624, to the RLC layers 606, 616, 626 and to the PDCP layers 608, 618, 628.

Figure 7:
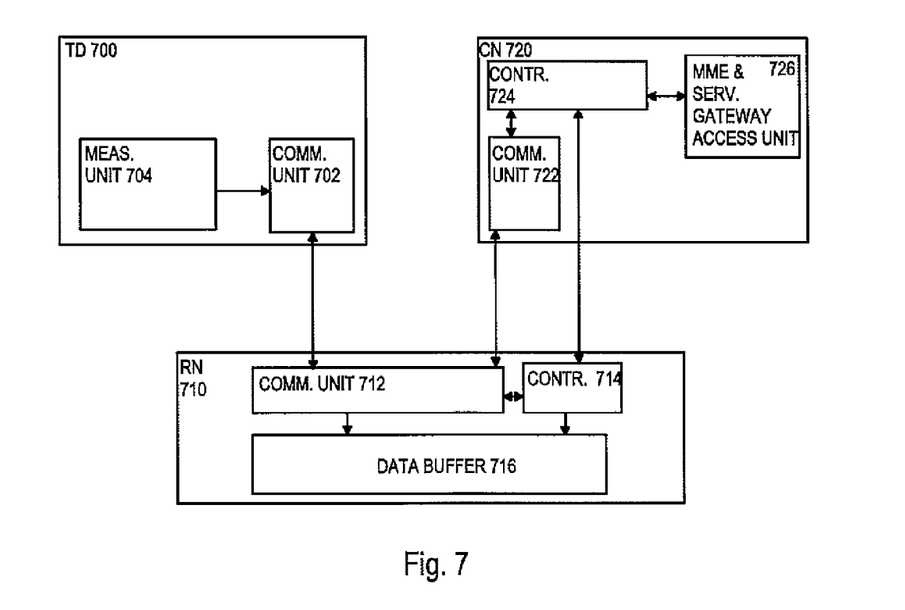
FIG. 7 illustrates the structure of the central node, the terminal device and the relay node.

A very general architecture of the communication system with the relay nodes capable of assisting in the handover is shown in FIG. 7. The figure shows only the required elements and functional entities for understanding the handover procedure. Other components have been omitted for reasons of simplicity. The implementation of the elements and functional entities may vary from that being shown in FIG. 7. The connections shown in FIG. 7 are logical connections, and the actual physical connections may be different. It is apparent to a person skilled in the art that the mobile telecommunication systems also comprise other functions and structures. Furthermore, the layout of the units does not reflect the actual placing of the units or their actual positions regarding the layers in the nodes. In other words, the figure does not reflect which units are located, e.g., on the radio link control layer or the radio resource control layer.

A terminal device (TD) 700 in a system where the relay nodes are capable of collaborating in the handover procedure may comprise, e.g., a communication unit 702, such as transceiver (TRX) capable of transmitting and receiving data, and a measurement unit 704. The TRX 702 may comprise a receiver and a transmitter, and it may be connected to logical elements located on other layers such as the MAC layer and the RRC layer. The measurement unit 704 may be configured to perform the measurements required so that the terminal device, the relay node or the central node, once it has received these measurement results, may determine the need of a handover. The measurement unit 704 may be connected to the TRX 702 and the TRX 702 may be triggered to transmit the handover-related data obtained from the measurement results to the relay node 710. The handover-related data may contain information regarding the current serving cell and the adjacent cells to the current serving cell. It may further comprise the status of certain parameters. The parameters that are measured may include, but are not limited to, at least one of the following: the received signal strength and the CIR at the serving cell as well as at the adjacent neighbouring cells.

The relay node 710 may comprise a TRX 712 capable of transmitting and receiving data. The TRX 712 may comprise a receiver and a transmitter and it may be connected to logical elements located at other layers. The TRX 712 may be configured to receive user data related to the terminal device. Furthermore, the relay node 710 may comprise a controller 714. The controller 714 may be implemented with a digital signal processor provided with suitable software embedded on a computer readable medium, or with separate logic circuits, for example with an application specific integrated circuit (ASIC). The controller 714 may comprise an input/output (I/O) interface such as computer port for providing communication capabilities. The input/output interface may perform signal-processing operations for enabling a physical channel connection, if needed. The controller 714 may be configured to process the handover-related data, determine and decide the need for the handover of the TD 700 and initiate the handover procedure by sending a handover request to the central node. Moreover, the controller 714 may perform resource allocation of the relay node 710 and the establishment of the relayed link between the relay node 710 and the terminal device 700. The controller 714 may further perform the resource releasing related to the resources at the source relay node. The relay node may further include a data buffer 716, which may be configured to receive user data from the central node and to buffer user data until the handover procedure is complete. The data buffer 716 may be connected to the controller 714 so that the controller may guide the buffering process during the handover for the TD 700.

The controller 714 may be used to transmit the handover request to the central node 720. The handover request may contain information regarding the target cell of the handover.

The controller 714 may be configured to communicate the capabilities of the RN 710 to the CN 720 by receiving the capability enquiry message from the CN 720 and by transmitting the capability information message to the CN 720. The controller 714 may further be configured to receive the capability information confirm message from the CN 720.

The central node 720 may include a TRX 722 capable of transmitting and receiving data. The TRX 722 may comprise a receiver and a transmitter, and it may be connected to logical elements located on other layers. The TRX 722 may be configured to receive a handover request message.

Furthermore, the CN 720 may comprise a controller 724. The controller 724 may be implemented with a digital signal processor provided with suitable software embedded on a computer readable medium, or with separate logic circuits, for example with an ASIC. The controller 724 may comprise an input/output (I/O) interface such as computer port for providing communication capabilities. The input/output interface may perform signal-processing operations for enabling a physical channel connection, if needed. The controller 724 may be configured to perform actions related to a handover procedure. It may, e.g., perform the handover decision if relay node has not done it. The handover request based on the handover decision may be transmitted to the target cell for informing the target cell that there is need for the handover for the TD 700. It may further suspend the transmission of the user data to the RN 710 if the handover request is transmitted to the target cell. Furthermore, it may perform part of the admission control related to the handover. The admission control may include, e.g., the configuration of the link between the relay node 710 and the central node 720.

The controller 724 may be used to forward the user data to the target cell for buffering. The controller 724 may be configured to communicate the capabilities of the RN 710 by transmitting the capability enquiry message to the RN 710 and by receiving the capability information message from the RN 710. The controller 724 may further be configured to transmit the capability information confirm message to the RN 710.

The controller 724 may further perform the resource releasing at the source central node. The controller 724 may be connected to the controller 714 located at the relay node 710. The connection may be wired or wireless. The controllers 714, 724 may control the communication between the protocol layers and between the radio network elements by applying the I/O interfaces.

The central node 720 may further include a mobility management entity (MME) and serving gateway access unit 726 which may be used to transmit and receive data to and from the MME and serving gateway.

Figure 8:
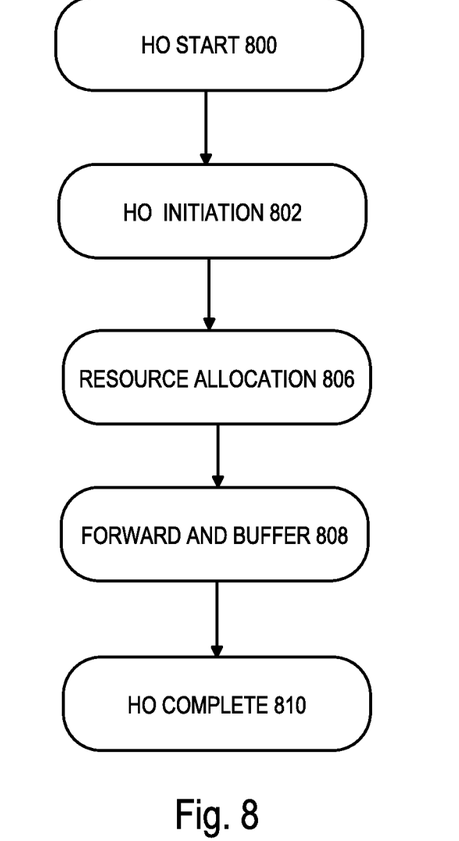
FIG. 8 shows a flow diagram of the handover for the terminal device in the communication network with the relay extension.

The flow diagram in FIG. 8 illustrates part of the steps that may be conducted in the handover for the terminal device.

In step 800, at the beginning of the handover, the terminal device may transmit the handover-related data obtained from the measurements performed at the terminal device to the source relay node. The handover-related data may contain information regarding the target cell.

In step 802, the source relay node connected to the central node via X2 interface may determine the need for the handover of the terminal device on the basis of the handover-related data. The source relay node may further initiate the handover by transmitting the handover request to the source central node, if the source relay node has determined that there is a need for the handover of the terminal device. The source central node may process and transmit the handover request to the target central node and the source central node may further suspend any terminal device -related user data transmission to the source relay node.

In step 806, the handover request has been received from the target central node, and the target central node may perform the admission control of the backhaul link. The target relay node may further perform the allocation of the resources for a communication link between the terminal device and the target relay node, wherein the resource allocation relates to an establishment of a communication link for the terminal device. After this, the target relay node may inform the target central node that the handover for the terminal device may proceed further.

In step 808, after the connections between the source and the target cells may have been established, the target central node may forward the user data related to the terminal device obtained from the source nodes to the target relay node. The target relay node may buffer the data until the handover for the terminal device is completed.

In step 810, the handover for the terminal device may be complete and the data transmission may occur between the target relay node and the terminal device, between the target relay node and the target central node, and between the target central node and the service gateway. Furthermore, the unused resources may be released at the source cell.

The capabilities of the relay node affect the control of the handover procedure. That is, if the relay node is not capable of collaborating with the central node, then the relay node is a simple radio bearer relay node and simply retransmits the handover-related data in step 802 and leaves the HO initiation and decision to the central node. Similarly, in the target cell, the admission control of the relayed link in step 806 is left for the target central node if the target relay node is a simple radio bearer node. Embodiments of the invention may be implemented as computer programs in the central node, the relay node and the terminal device according to the embodiments of the invention. The computer programs comprise instructions for executing a computer process for controlling the handover procedure in a mobile communication system with a relay extension. The computer program implemented in the central node may carry out, but is not limited to, the tasks related to FIGS. 2 to 5 and 8. The computer program implemented in the relay node may carry out, but is not limited to, the tasks related to FIGS. 2 to 5 and 8. The computer program implemented in the terminal device may carry out, but is not limited to, the tasks related to FIGS. 2 to 3 and 8.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

The invention is backward compatible with the 3GPP LTE release 8 specification from the terminal device's point of view. Consequently, no changes to the terminal device implementation need to be made when implementing the described invention.

Even though the invention is described above with reference to an example according to the accompanying drawings, it is clear that the invention is not restricted thereto but can be modified in several ways within the scope of the appended claims.

The invention claimed is:

1. A method, comprising:
utilizing a handover procedure for handing a terminal device over from a source cell to a target cell;
receiving handover-related data from the terminal device at a source relay node;
determining, by the source relay node, the need for a handover of the terminal device from the source relay node to a target node on the basis of the received handover-related data;
receiving, by the source relay node an enquiry from a source central node controlling the source relay node about the collaborating capabilities of the source relay node regarding the handover so that the source central node can determine whether the source relay node is capable of assisting in the handover;
transmitting, by the source relay node to the source central node a capability information message about the collaborating capabilities of the source relay node regarding the handover;
receiving, by the source relay node from the source central node a capability information confirm message confirming that the source central node has knowledge about the collaborating capabilities of the source relay node regarding the handover; and
initiating the handover procedure at the source relay node by transmitting a handover request to the source central node controlling the source relay node and releasing resources allocated to the terminal device, if it has been determined by the source relay node that there is a need for the handover of the terminal device, so that the terminal device is handed over from the source cell to the target cell and terminal device-related user data transmission is suspended to the source relay node.

2. The method of claim 1, wherein the handover-related data contains information regarding at least one of the following: a currently serving cell of the terminal device, one or more neighbouring cells to the currently serving cell of the terminal device, and the received power levels at the terminal device from the currently serving cell and the one or more neighbouring cells to the currently serving cell.

3. The method of claim 2, wherein the handover request comprises information regarding the source and target cells of the handover for the terminal device.

4. The method of claim 2, further comprising: transmitting user data targeted to the terminal device to the source central node.

5. The method of claim 2, wherein determining the need for the handover is further based on radio resource management information.

6. The method of claim 1, wherein the handover request comprises information regarding the source and target cells of the handover for the terminal device.

7. The method of claim 6, further comprising: transmitting user data targeted to the terminal device to the source central node.

8. The method of claim 6, wherein determining the need for the handover is further based on radio resource management information.

9. The method of claim 1, further comprising:
transmitting user data targeted to the terminal device to the source central node.

10. The method of claim 9, wherein determining the need for the handover is further based on radio resource management information.

11. The method of claim 1, wherein determining the need for the handover is further based on radio resource management information.

12. A method, comprising:
utilizing a handover procedure for handing a terminal device over from a source cell to a target cell;
receiving a handover request from a source relay node at a source central node;
transmitting, by the source central node controlling the source relay node, an enquiry about the collaborating capabilities of the source relay node regarding the handover so that the source central node can determine whether the source relay node is capable of assisting in the handover;
receiving, by the source central node from the source relay node a capability information message about the collaborating capabilities of the source relay node regarding the handover;
transmitting, by the source central node to the source relay node a capability information confirm message confirming that the source central node has knowledge about the collaborating capabilities of the source relay node regarding the handover; and
suspending terminal device-related user data transmission to the source relay node, whereby the handover procedure is initiated at the source relay node by transmitting the handover request to the source central node controlling the source relay node and resources allocated to the terminal device are released, if it has been determined by the source relay node that there is a need for the handover of the terminal device from the source relay node to the target node on the basis of handover-related data received by the source relay node from the terminal device, so that the terminal device is handed over from the source cell to the target cell.

13. The method of claim 12, further comprising:
transmitting user data targeted to the terminal device to the target central node.

14. The method of claim 13, wherein the handover request comprises at least one of radio resource control information and approval for the handover.

15. A method of claim 13, further comprising: receiving a handover acknowledgement message; and transmitting a handover command message to the source relay node based on the information received from the handover acknowledgement message.

16. A method of claim 13, further comprising: transmitting a release resources message to the source relay node.

17. A method of claim 13, further comprising transmitting remaining downlink data targeted to the terminal device to the target central node.

18. The method of claim 12, wherein the handover request comprises at least one of radio resource control information and approval for the handover.

19. The method of claim 18, further comprising: transmitting user data targeted to the terminal device to the target central node.

20. A method of claim 18, further comprising: receiving a handover acknowledgement message; and transmitting a handover command message to the source relay node based on the information received from the handover acknowledgement message.

21. A method of claim 18, further comprising: transmitting a release resources message to the source relay node.

22. A method of claim 18, further comprising transmitting remaining downlink data targeted to the terminal device to the target central node.

23. A method of claim 12, further comprising: receiving a handover acknowledgement message; and transmitting a handover command message to the source relay node based on the information received from the handover acknowledgement message.

24. A method of claim 23, further comprising: transmitting a release resources message to the source relay node.

25. A method of claim 23, further comprising transmitting remaining downlink data targeted to the terminal device to the target central node.

26. A method of claim 12, further comprising: transmitting a release resources message to the source relay node.

27. A method of claim 26, further comprising transmitting remaining downlink data targeted to the terminal device to the target central node.

28. A method of claim 12, further comprising transmitting remaining downlink data targeted to the terminal device to the target central node.

29. A method of claim 28, further comprising transmitting remaining downlink data targeted to the terminal device to the target central node.

30. An apparatus, comprising:
one or more processors; and
one or more memories including computer program code, the one or more memories and the computer program code configured to, with the one or more processors, cause the apparatus to perform at least the following:
utilize a handover procedure for handing a terminal device over from a source cell to a target cell;
receive handover-related data from the terminal device at a source relay node;
determine, at the source relay node, the need for a handover of the terminal device from the source relay node to a target node on the basis of the received handover-related data;
receive, by the source relay node an enquiry from a source central node controlling the source relay node about the collaborating capabilities of the source relay node regarding the handover so that the source central node can determine whether the source relay node is capable of assisting in the handover;
transmit, by the source relay node to the source central node a capability information message about the collaborating capabilities of the source relay node regarding the handover;
receive, by the source relay node from the source central node a capability information confirm message confirming that the source central node has knowledge about the collaborating capabilities of the source relay node regarding the handover; and
initiate the handover procedure at the source relay node by transmitting a handover request to the source central node controlling the source relay node and releasing resources allocated to the terminal device, if it has been determined by the source relay node that there is a need for the handover of the terminal device, so that the terminal device is handed over from the source cell to the target cell and terminal device-related user data transmission is suspended to the source relay node.

31. A non-transitory computer-readable memory that stores program instructions, the execution of which result in operations that comprise:
receiving handover-related data from the terminal device at a source relay node;
determining, at the source relay node, the need for a handover of the terminal device from the source relay node to a target node on the basis of the received handover-related data;
receiving, by the source relay node an enquiry from a source central node controlling the source relay node about the collaborating capabilities of the source relay node regarding the handover so that the source central node can determine whether the source relay node is capable of assisting in the handover;
transmitting, by the source relay node to the source central node a capability information message about the collaborating capabilities of the source relay node regarding the handover;
receiving, by the source relay node from the source central node a capability information confirm message confirming that the source central node has knowledge about the collaborating capabilities of the source relay node regarding the handover; and
initiating the handover procedure at the source relay node by transmitting a handover request to the source central node controlling the source relay node and releasing resources allocated to the terminal device, if it has been determined by the source relay node that there is a need for the handover of the terminal device, so that the terminal device is handed over from the source cell to the target cell and terminal device-related user data transmission is suspended to the source relay node.

32. An apparatus, comprising:
one or more processors; and
one or more memories including computer program code, the one or more memories and the computer program code configured to, with the one or more processors, cause the apparatus to perform at least the following:
utilize a handover procedure for handing a terminal device over from a source cell to a target cell;
receive a handover request;
transmit the handover request from the apparatus to a target central node;
transmit, by the apparatus controlling the source relay node, an enquiry about the collaborating capabilities of the source relay node regarding the handover so that the apparatus can determine whether the source relay node is capable of assisting in the handover;
receive, by the apparatus from the source relay node a capability information message about the collaborating capabilities of the source relay node regarding the handover;
transmit, by the apparatus to the source relay node a capability information confirm message confirming that the apparatus has knowledge about the collaborating capabilities of the source relay node regarding the handover; and suspend terminal device-related user data transmission to the source relay node, whereby the handover procedure is initiated at the source relay node by transmitting a handover request to the apparatus controlling the source relay node and resources allocate to tie terminal device are released, if it has been determined by the source relay node that there is a need for the handover of the terminal device from the source relay node to the target node on the basis of handover-related date received by the source relay node from the terminal device, so that the terminal device is handed over from the source cell to the target cell.

33. A non-transitory computer-readable memory that stores program instructions, the execution of which result in operations that comprise:

utilizing a handover procedure for handing a terminal device over from a source cell to a target cell;

receiving a handover request;

transmitting the handover request to a target central node;

transmitting, from an apparatus controlling the source relay node, an enquiry about the collaborating capabilities of the source relay node regarding the handover to enable a determination of whether the source relay node is capable of assisting in the handover;

receiving from the source relay node a capability information message about the collaborating capabilities of the source relay node regarding the handover;

transmitting to the source relay node a capability information confirm message confirming knowledge about the collaborating capabilities of the source relay node regarding the handover; and suspending terminal device-related user data transmission to the source relay node, whereby the handover procedure is initiated at the source relay node by transmitting a handover request to the apparatus controlling the source relay node and resources allocated to the terminal device are released, if it has been determined by the source relay node that there is a need for the handover of the terminal device from the source relay node to the target node on the basis of handover-related data received by the source relay node from the terminal device, so that the terminal device is handed over from the source cell to the target cell.

* * * * *

UNITED STATES PATENT AND TRADEMARK OFFICE
CERTIFICATE OF CORRECTION

PATENT NO. : 8,897,790 B2  
APPLICATION NO. : 12/919245  
DATED : November 25, 2014  
INVENTOR(S) : Hamalainen et al.

Page 1 of 1

It is certified that error appears in the above-identified patent and that said Letters Patent is hereby corrected as shown below:

In the Claims

Claim 32, col. 17, line 5 "allocate" should be deleted and --allocated-- should be inserted.

Claim 32, col. 17, line 5 "tie" should be deleted and --the-- should be inserted.

Signed and Sealed this  
Third Day of February, 2015

Michelle K. Lee  
*Deputy Director of the United States Patent and Trademark Office*